(12) United States Patent
Kassir

(10) Patent No.: US 8,489,480 B2
(45) Date of Patent: Jul. 16, 2013

(54) METHOD AND SYSTEM FOR RESTRUCTURING DEBT

(76) Inventor: Hassan Kassir, Irvine, CA (US)

( * ) Notice: Subject to any disclaimer, the term of this patent is extended or adjusted under 35 U.S.C. 154(b) by 164 days.

(21) Appl. No.: 12/928,655

(22) Filed: Dec. 16, 2010

(65) Prior Publication Data

US 2012/0158562 A1   Jun. 21, 2012

(51) Int. Cl.
*G06Q 40/00* (2006.01)

(52) U.S. Cl.
USPC .............................................. 705/35; 705/36

(58) Field of Classification Search
USPC ....................................................... 705/35–40
See application file for complete search history.

(56) References Cited

U.S. PATENT DOCUMENTS

2008/0114676 A1*   5/2008   Burton et al. ................... 705/40

\* cited by examiner

*Primary Examiner* — Thu Thao Havan
(74) *Attorney, Agent, or Firm* — Richard J. Hepner

(57) ABSTRACT

A method and system for restructuring debt are disclosed. The method restructures debt by transferring ownership of defined debt packages from debt holders to third-party debt buyers who function as financial bridges between the debtors and the debt holders. The method accelerates the debt resolution process by executing the debt-restructure agreement early in the debt resolution period, thereby eliminating the need for the debtor to accumulate debt settlement funds in an escrow fund prior to the initiation of settlement negotiations (as is the case in debt settlement), and erasing delinquent debt as soon as the debt-restructure agreement is executed. The method is designed and adapted to execution on a computer network system.

8 Claims, 2 Drawing Sheets

METHOD AND SYSTEM FOR RESTRUCTURING DEBT

CROSS REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of Invention

The present invention relates generally to the field of debt relief or debt resolution. This invention provides a more efficient market solution and an alternative to existing and malfunctioning debt settlement methods (both debt restructure and debt settlement—along with debt consolidation and bankruptcy—are branches of the general field of debt relief/resolution). More particularly, the present invention is a useful and novel computer network-based method of modeling a debt market, restructuring debt and debt ownership, and enabling and executing debt-purchase transactions in much less time than current debt settlement debt-negotiation practices. A system and technology infrastructure for practicing the method is disclosed.

2. Discussion of Related Art

The existing debt settlement market is in immediate need of a new method of conducting business. Analysis of the existing market reveals fraudulent, abusive, and deceptive practices that pose risks to consumers, and an absence of a market process that best achieves the interests of the creditors and/or the debtor consumers.

As consumer debt has risen to historic levels, a growing number of for-profit debt settlement companies have emerged. Debt settlement companies promise to negotiate, on the debtor's behalf, debt settlement agreements with creditors. Debt settlement companies typically represent that they will settle debt at forty to fifty cents on each dollar owed. In a typical debt settlement services contract, the debtor is required to make monthly payments into an escrow account until there are sufficient funds in escrow to permit the debt settlement service provider to negotiate a one-time settlement payment with the creditors. It may take years for sufficient funds to be accumulated. Debt settlement providers often charge a service fee up front, and almost all collect their fees from the escrow account during the first half of the contract, regardless of whether any debt settlement services have been, or will be performed. Debt settlement companies usually advise consumers to stop paying their creditors and to instead set up a special account to build savings that will be used in the future to negotiate a settlement. As the consumer deposits savings into the account, the debt settlement company withdraws money to cover its fees even though it hasn't reached a settlement with creditors. By stopping payments to creditors, the consumer ends up with a worse credit score, additional penalty fees and more interest charges, and becomes exposed to aggressive collection practices, lawsuits and bankruptcy. An additional disadvantage of current debt settlement industry practice is that, where the debt settlement company takes is fees up front or during the first half of the settlement period, the debt settlement company is not incentivized to reduce the amount of the debt, but merely to establish a payment plan. Further, once the debt settlement company takes its fees, it has little or no incentive even to negotiate any settlement.

In April 2010, the United States General Accountability Office (GAO) reported on its investigation into allegations that debt settlement companies engage in fraudulent, abusive, or deceptive practices that leave consumers in worse financial condition than they occupied before engaging the services of the debt settlement companies. The GAO concluded that "some debt settlement companies engage in fraudulent, deceptive, and abusive practices that pose a risk to consumers already in difficult financial situations." In fact, 17 of the 18 debt settlement companies from which the GAO was able to obtain information "follow a business model that calls for advance fees and stopping payment to creditors—practices that have been identified as abusive and harmful." Further, the GAO investigation concluded that "most of those [debt settlement companies] we contacted provided information that was deceptive, abusive, or, in some cases, fraudulent." For example, debt settlement companies claimed success rates that the GAO "found suspiciously high—85 percent, 93 percent, even 100 percent." In contrast, federal and state agencies report success rates in the single digits. Other GAO findings that constitute fraudulent or deceptive practice include guarantees or promises to obtain minimum reductions in debts (typically 40 to 50 cents on the dollar), false representations of membership in industry associations, indications that the programs are linked to the government or government programs. [Source: *Debt Settlement—Fraudulent, Abusive, and Deceptive Practices Pose Risk to Consumers*; United States Government Accountability Office; Gregory D. Kutz; Apr. 23, 2010.]

The Better Business Bureau (BBB) designated debt settlement as an "inherently problematic" business. Debt settlement companies are allowed by the BBB to escape the inherently problematic designation if they are able to prove, among other criteria, that "a majority (at least 50 percent) of its clients successfully complete its program and obtain a reduction in debt that is significant and exceeds the fees charged by the company." The two leading debt settlement industry associations, the Trade Association of Settlement Companies (TASC) and the United States Organizations for Bankruptcy Alternatives (USOBA) state that the 50 percent success rate criterion is "unrealistic." (Source: *Debt Settlement—Fraudulent, Abusive, and Deceptive Practices Pose Risk to Consumers*; United States Government Accountability Office; Gregory D. Kutz; Apr. 23, 2010)

The FTC reports that nearly two-thirds of consumers who enroll in debt relief services, most of which pay an advanced fee, end up dropping out of the programs within the first three years without getting the help they paid to receive. (Source: *FTC Adopts New Rules to Begin Curbing Debt Settlement Industry Abuses*; PR Newswire United Business Media Website; Jul. 29, 2010; retrieved Nov. 15, 2010; <http://www.prnewswire.com/news-releases/ftc-adopts-new-rules-to-begin-curbing-debt-settlement-industry-abuses-99568659.html>)

The United States Federal Trade Commission (FTC) has recognized the problems with existing debt settlement methods. The FTC has adopted a new set of regulations to begin addressing fraudulent, abusive and deceptive practices. The FTC adopted amendments to 16 CFR Part 310 Telemarketing Sales Rule (Rule), fully effective Oct. 27, 2010, which address the telemarketing of debt relief services. In that amendment, a debt settlement company is prohibited from collecting fees until it reaches a settlement on at least one of the consumer's debts that the consumer agrees to in writing, and the debtor has made at least one payment to the creditor under the settlement agreement. The Rule also requires specific pre-contract disclosures of material information about offered debt relief services, such as how long the settlement process will take to achieve results and how much it will cost, and prohibits specific misrepresentations about material aspects of debt relief services.

While the FTC Rule takes a step in the correct direction, it falls far short of resolving industry issues. The FTC Rule applies to telemarketing activities and inbound calls made to debt relief companies in response to general media advertisements. The FTC Rule provides no relief for in-person sales or Internet-only sales. Further, the FTC Rule addresses the timing of fees only; not the nature, amount or fairness of fees. More generally, the FTC Rule does little to create a market which is responsive to the broader needs of both the creditor and debtor, such as timely debt resolution transactions and credit score recovery, avoidance of collection, lawsuit and bankruptcy actions, and maximized return to the creditor. What is needed is a method and system for restructuring debt and debt ownership.

BRIEF SUMMARY OF THE INVENTION, ITS OBJECTS AND ADVANTAGES

In view of the foregoing limitations and disadvantages inherent to the known methods in the related art, the present invention provides a novel and useful computer network-based method of restructuring debt. The present invention provides a particular solution to the well-recognized and previously unsolved problems plaguing in the debt settlement industry.

Specifically, the present invention creates defined debt packages and a debt restructure market, provides a computer network-based mechanism whereby the defined debt packages are placed in the debt restructure market for purchase by third-party debt buyers, and enables and executes debt-purchase agreements that transfer ownership of the debt from the debt holder to third-party debt buyers at the front end of the debt-settlement cycle. In current debt-settlement practice, a debt settlement service provider (DSSP) signs up a client debtor. The DSSP offers to negotiate a debt settlement with the client debtor's debt holders. However, in order to enter negotiations with the debt holders, the client debtor must accumulate sufficient funds to pay the negotiated settlement at the time when the settlement is negotiated. This may take several years, during which time the negative consequences of past-due debt (credit deterioration, collection activities, potential litigation, etc.) continue. In addition, the past-due debt remains open on the debt holder's books. In the present invention, debt and debt ownership are completely restructured at the front end of the debt restructure process. Debt packages are identified and valued, then sold to third-party debt buyers without the need for the debtor to accumulate the funds necessary to discharge the debt. Immediately upon debt restructure, the debt holder is compensated and may close the books on the debt, and the debtor is relieved of past-due status.

A principal object of the present invention is to accelerate the debt-settlement cycle and to realize the attendant advantages. The present invention achieves this object by placing debt packages in the market for purchase by third-party debt buyers at the front of the debt restructure cycle. The debt-purchase transaction may be executed without requiring the debtor to accumulate sufficient funds in a savings account to pay the debt before the debt-settlement negotiation begins.

Execution of the debt restructure at the front end of the process permits the debtor to avoid the detrimental effects of a prolonged debt-settlement cycle such as continuing to fall further behind on past due debts; defaulting on debts that are not yet past due; continued accumulation of penalties, interest and fees; continued deterioration of the debtor's credit score; and on-going exposure to aggressive debt collection practices and, potentially, litigation; repossession and foreclosure. The early debt restructure permits the debtor to immediately stop adverse action by credit holders, establish a certain path to debt resolution, and begin the process of repairing credit scores (credit restoration). The delinquent debt is erased as soon as the debt-restructure agreement is executed. In addition, the restructure amount ultimately paid by the debtor (typically 40% of the original debt amount) will be less than the sum of the original debt amount plus interest, penalties and fees. Costs flowing from an adverse credit rating are contained.

The advantages of an early debt restructure agreement extend beyond the debtor. The debt holder receives the debt purchase payment from the third-party debt buyer at the beginning of the process, allowing the debt holder to close the books on problem debt without further delay, reducing the time to close the debt holder's books from approximately three years to three months. In addition, the debt holder avoids the costs of collecting and maintaining the debt. Further, the debt holder receives a greater return on the problem debt. In current debt settlement approaches, the debt holder has two options. The debt holder may hold the debt open (potentially for 2-5 years), pay 35% of any debt amount recovered to a collection agency, and write off the unrecovered debt as a loss. Alternatively, the debt holder may sell the debt at wholesale for 6% to 9% of the debt amount. In the debt restructure process of the present invention, the debt holder may sell the debt to a third-party debt buyer at the front of the debt settlement cycle for 18% to 22% (more than double the wholesale purchase price) of the debt amount.

The third-party debt buyer is provided the opportunity, in return for providing a financial bridge between the debtor and the debt holder and assuming the risk from the debt holder, to profit from investing in the returns to be realized over the debt pay-off period. The third-party debt buyer pays 18% to 22% of the original debt amount up front to the debt holder in return for the opportunity to receive 40% or greater of the debt amount upon payment of the restructured debt by the debtor.

The cumulative effect of accelerated debt restructure transactions is to create a more efficient debt resolution market and industry. The present invention brings certainty and transaction closure to the market.

Another objective of the present invention is to adapt the method to execution on a computer network system. In fact, the ability to execute the method is integral with, and reliant upon its technology infrastructure in order to create a scalable market and to realize process efficiency advantages. The present invention transforms a general purpose computer into as specially-designed and configured computer for the purpose of modeling a debt market, restructuring debt and debt ownership, and enabling and executing debt restructure transactions. The present method is readily adapted to computer network implementation. The enabling computer network system is disclosed herein.

A further objective of the present invention is to achieve 100 percent electronic debt restructuring. This advantage may be achieved where the participating debt holders and third-party debt buyers allow the system to make and respond to offers automatically and electronically (thereby eliminating human intervention). At this level of automation, the debt restructure may be completed within seconds of a client debtor e-signing a debtor restructure agreement.

Other objects and advantages of the present invention will become readily apparent to those with skill in the art from the following figures, descriptions and claims. As will be appreciated by those with skill in the art, the method of the present invention may implemented in a plurality of equivalent steps; the system may be implemented in a plurality of equivalent embodiments. Such alternative process steps and system embodiments, and their attendant objectives and advantages, are intended to be within the scope of the present invention and, therefore, the examples set forth herein shall not be limiting.

BRIEF DESCRIPTION OF THE DRAWINGS

The nature of this invention, as well as all its objects and advantages, will become readily apparent and understood upon reference to the following detailed description when considered in conjunction with the accompanying drawings, in which like reference numerals designate like parts throughout the figures thereof, and wherein.

DETAILED DESCRIPTION OF THE PREFERRED EMBODIMENTS

The following description is provided to enable any person skilled in the art to make and use the invention, and sets forth the best modes contemplated by the inventor of carrying out the invention. The present invention shall not be limited to the examples disclosed. Rather, the scope of the invention shall be as broad as the claims will allow.

Figure 1:
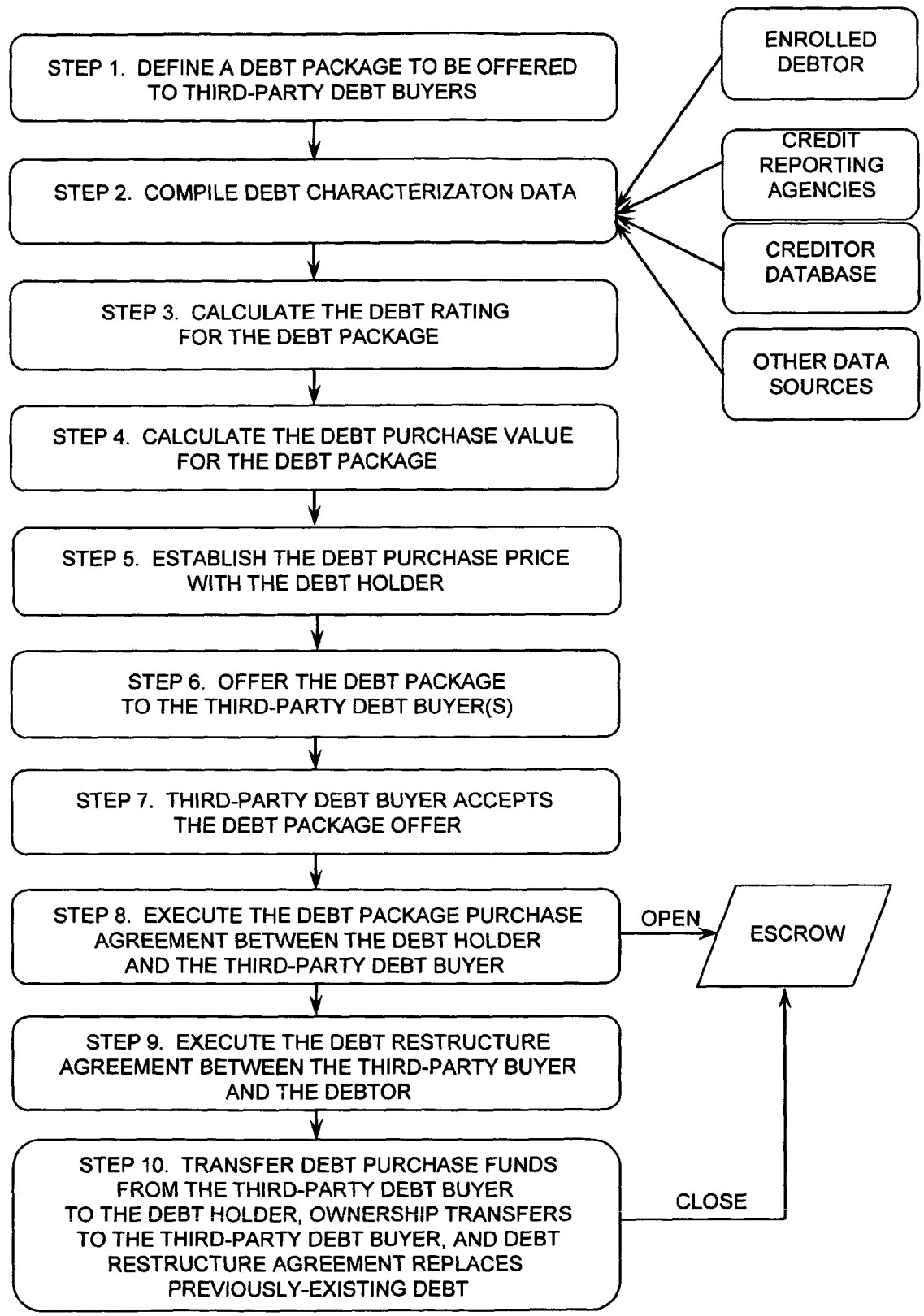
FIG. 1 presents a flowchart showing the steps in one preferred embodiment of the debt restructuring method.

Referring now to the drawings, FIG. 1 presents a flowchart showing the steps in one preferred embodiment of the debt restructuring method. The method starts after one or more client debtors are enrolled to participate in the debt restructuring process.

Step 1 is to define a debt package to be offered for sale to one or more third-party debt buyers. In one preferred embodiment of the present invention, the debt package is defined as debt owned by a particular debt holder, such as credit card debts owed to one particular bank. In an extension of this embodiment (grouping or bundling of offers), debt restructure automation allows the system to aggregate individual debts with the same debt holder, the bundled debts to be presented as a single aggregate debt restructure offer to debt buyers, thereby achieving speed, economies of scale, and superior pricing potential. Alternatively, the debt package is defined as debt of a common nature, such as a consolidation of credit card debts. In another alternative, the debt package is defined as all or part of the various debts owed by a particular client debtor, or by a set of client debtors. In yet another preferred embodiment, the debt of one or more client debtors is consolidated into logical debt packages, the consolidated debt package is divided into shares, and the third-party debt buyers are then offered the option to purchase one or all of the shares of the debt package. Essentially, any useful criteria for separating or consolidating the debt owed by one or more client debtors may be employed to identify debt packages. This step may be automated, utilizing debt package definition algorithms in the debt restructuring computer/data processor or, alternatively, may be performed external to the debt restructuring computer/data processor and treated as an input to the restructuring system database.

Step 2 is to compile debt characterization data. This data is later used to calculate a rating for the debt package and to calculate the purchase value of the debt package. Relevant characterization data may include, but are not limited to the credit score of the enrolled debtor, whether the debt is secured or unsecured, when the debt becomes due or became past due, the amount of the debt, whether the debt is business or personal, the creditor name, and the debt type (i.e., credit card, unsecured loan, auto loan, mortgage, etc.). This debt characterization data may be collected from the enrolled debtor, the debt-holding creditor, credit reporting agencies, or other data sources.

Step 3 is to calculate the debt rating for the debt package. The debt rating is subsequently utilized to calculate the debt purchase value. The debt rating calculation utilizes debt characterization data compiled in Step 2. In one preferred embodiment of the present invention, the debt rating considers factors such as risk, potential return on investment, time to realize the return on investment. Other embodiments may consider any factors useful to rating the debt package. A debt rating is calculated for each individual debt package utilizing a debt rating algorithm. In one exemplary embodiment of the present invention, wherein the debt package is comprised of multiple component debt elements, the debt rating calculation algorithm is in the form:

$$R_{TOTAL} = (A_1 X_1 + B_2 Y_2 + \ldots C_n Z_n) / (X_1 + Y_2 + \ldots + Z_n)$$

where:

$R_{TOTAL}$ = the aggregate debt rating for all components of the debt package.

A, B and C = fixed weighting factors assigned to specific components 1 through n of the total debt package. The weighting factors may be based upon any factors useful to rating the debt, such as risk, potential return on investment, and time to realize the return on investment.

X, Y and Z = the dollar amount of specific components 1 through n of the debt package.

n = the number of specific components of the debt package. Examples of specific components of a debt package are: current secured debt, past due secured debt, current unsecured debt, and past due unsecured debt.

It is within the contemplation of the present invention that the specific variables and weighting factors may vary across the various possible implementations of the present invention.

Step 4 is to calculate the debt purchase value. In one preferred embodiment of the present invention, the purchase value represents the balance of risk and return on investment for a particular debt package. The debt purchase value is calculated using relationships that define purchase values associated with the various debt ratings. For example, a debt rating indicating a low-risk, high-return debt package will have a higher debt purchase value than will a debt package with a debt rating indicating a high risk and low return.

Step 5 is to establish the debt purchase price with the debt holder. In one preferred embodiment, a system offer that defines the price to be offered for the debt package, based upon the previous debt rating and debt value calculations, is generated and presented to the debt holder. The debt holder may accept the system offer, reject the system offer, or respond with a counter offer which may either be accepted or rejected by the system. Upon debt holder acceptance of the system offer or, alternatively, system acceptance of the counter offer, the debt purchase value is updated to reflect the negotiated debt purchase price.

Step 6 is to offer the debt package to third-party debt buyers. The debt package may be posted online for review by third-party debt buyers. Alternatively, the debt package may be pushed to selected third-party buyers.

Step 7 is the third-party debt buyer's acceptance of the offered debt package. In one preferred embodiment of the method, the debt package is offered on a fixed-price basis; the third-party debt buyer may either decide to purchase the debt package, or not. In an alternative embodiment, the system can accommodate a counter offer from the third-party debt buyer. The system then presents the debt buyer's counter offer to the debt holder for consideration.

Upon the third-party debt buyer's acceptance of the offered debt package or, alternatively, the debt holder's acceptance of the third-party debt buyer's counter offer, Step 8 is to execute a debt package purchase agreement which transfers ownership of the debt package from the debt holder to the third-party debt buyer. The transaction is placed in escrow.

In Step 9, a debt restructure agreement is executed between the third-party debt buyer and the debtor. The debt restructure agreement terminates the previously-existing debt of the debtor, and defines the terms of the restructured debt agreement between the debtor and the third-party debt buyer.

In Step 10, the third-party debt buyer transfers the debt purchase funds to the debt holder, ownership of the debt package is transferred to the third-party debt buyer, the transaction escrow is closed, and the debt restructure agreement formally replaces the previously-existing debt of the debtor.

Note that the third-party debt-buyer's acceptance of the offered debt package in Step 7, execution of the debt package purchase agreement in Step 8, execution of the debt restructure agreement in Step 9, transfer of debt purchase funds in Step 10, transfer of debt package ownership in Step 10, and replacement of previously-existing debts by the debt restructure agreement in Step 10 are mutually-dependent and contingent activities. Completion of the process requires interdependent performance by the debtor, the debt holder, and the third-party debt buyer.

In an alternative embodiment of the present invention, the transfer of debt purchase funds may be executed between the third-party debt buyer and the debt holder outside of the computer network system.

Figure 2:
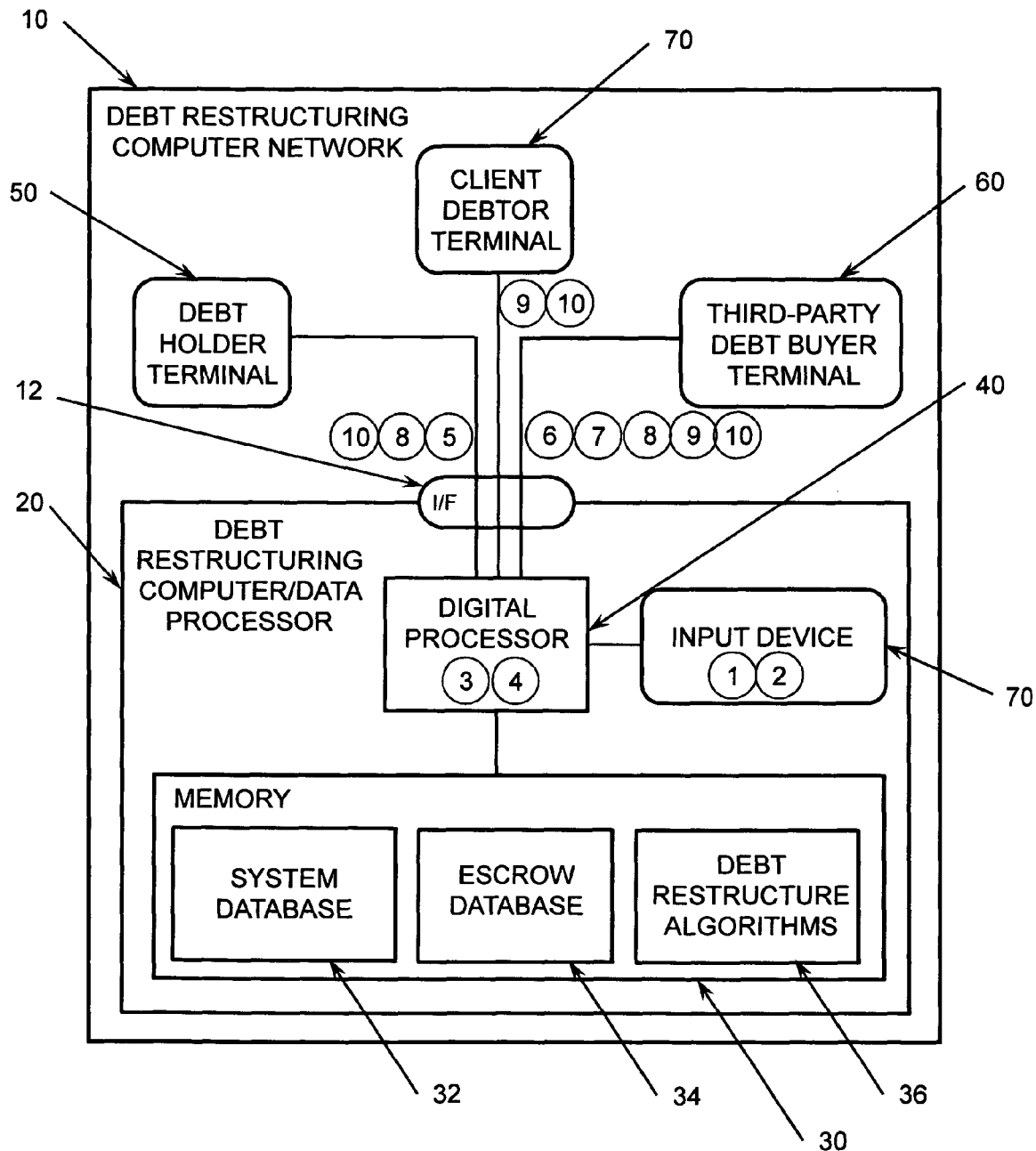
FIG. 2 presents a schematic representation of one preferred embodiment of a system for implementing the computer network-based method.

FIG. 2 presents a schematic representation of one preferred embodiment of a system for implementing the computer network-based method. A debt restructuring computer network 10 is comprised of a debt restructuring computer/data processor 20, a debt holder terminal 50, a third-party buyer terminal 60, and a client debtor terminal 70. The debt restructuring computer/data processor 20 is comprised of a memory 30, a digital processor 40, an input device 70, and a network interface 12. The input device 70 may be a data entry keyboard, a stored or transmitted database, or any other useful means or device. The memory 30 hosts the system database 32, the escrow database 34, and debt restructure algorithms 36.

Debt package definition characterization data is entered into the system database 32 by means of the input device 70. The digital processor 40 operates on the debt characterization data in the system database 32, employing debt restructuring algorithms 36, to calculate a debt rating and debt purchase value for the defined debt package. The debt purchase price is established by means of communication between the debt restructuring computer/data processor 20 and the debt holder terminal 50. The debt package is offered to, and accepted by the third-party debt buyer by means of communication between the debt restructuring computer/data processor 20 and the third-party debt buyer terminal 60. The debt package purchase agreement is executed by means of communication between the debt restructuring computer/data processor 20 and the third-party debt buyer terminal 60, and between the debt restructuring computer/data processor 20 and the debt holder terminal 50. The pending transaction is stored in the escrow database 34. The debt restructure agreement is executed by means of communication between the debt restructuring computer/data processor 20 and the third-party debt buyer terminal 60, and between the debt restructuring computer/data processor 20 and the client debtor terminal 70. The transfer of debt purchase funds, transfer of debt package ownership, and replacement of the previously existing debt with the debt restructure agreement is accomplished by means of communication between the debt restructuring computer/data processor 20 and the third-party debt buyer terminal 60, the client debtor terminal 70, and the debt holder terminal 50.

The individual steps of the disclosed method may be modified, interchanged or combined, or additional steps added without departing from the spirit of the invention. Further, the present invention may be exercised in alternative embodiments other than those illustrated in the Figures. Such modifications, combinations, additions and alternatives are within the contemplation of the present invention. The exemplary method and embodiments disclosed are not intended to limit the scope of this invention. Accordingly, the scope of the invention should be determined not by the embodiments illustrated, but by their legal equivalents, and shall be as broad as the claims will allow.

What is claimed is:

1. A computer network-based method for restructuring debt, the computer network including at least one server system, at least one client system associated with a debt holder, and at least one client system associated with a third-party debt buyer, the method comprising:
   (a) defining a debt package to be offered for sale to one or more third-party debt buyers;
   (b) compiling debt characterization data for said debt package;
   (c) calculating a debt rating for the debt package using the compiled debt characterization data;
   (d) calculating the debt purchase value of the debt package using relationships that define purchase values associated with various debt ratings;
   (e) establishing the debt purchase price with the debt holder;
   (f) offering the debt package to one or more third-party debt buyers;
   (g) processing acceptance of the offered debt package by a third-party debt buyer;
   (h) executing a debt package purchase agreement between the debt holder and the third-party debt buyer;
   (i) executing a debt restructure agreement between the third-party buyer and the debtor; and
   (j) transferring debt purchase funds from the third-party debt buyer to the debt holder; thereby completing the transfer of debt package ownership from the debt holder to the third-party debt buyer, replacing previously-existing debt owed by the debtor to the debt holder with the debt restructure agreement between the debtor and the third-party debt buyer.

2. The method of claim 1, wherein said debt package is comprised of the debt of a particular client debtor or set of client debtors.

3. The method of claim 1, wherein said debt package is comprised of debt owned by a particular debt holder or set of debtor holders.

4. The method of claim 1, wherein said debt package is comprised of a consolidated set of debts.

5. The method of claim 1, wherein said debt package is divided into shares, the third party debt buyers then being offered the option to purchase one or more shares of the debt package.

6. The method of claim 1, wherein the transfer of debt purchase funds is executed between the third-party debt buyer and the debt holder outside of the computer network system.

7. A computer network-based system for restructuring debt, the system comprising:
(a) at least one debt holder terminal;
(b) at least one client debtor terminal;
(c) at least one third-party debt buyer terminal;
(d) at least one debt restructuring computer/data processor, said debt restructuring computer/data processor further comprising at least one digital processor, at least one network interface configured or designed to provide a communication link to other network devices in the data network, memory, and at least one input device; and
(e) a computer software product, said computer software product including a computer usable medium having computer readable code embodied therein, the computer readable code comprising computer code for implementing the method of claim 1;
the system being configured or designed to:
(i) define a debt package to be offered for sale to one or more third-party debt buyers;
(ii) compile debt characterization data for said debt package;
(iii) calculate a debt rating for the debt package using the compiled debt characterization data;
(iv) calculate the debt purchase value of the debt package using relationships that define purchase values associated with various debt ratings;
(v) establish the debt purchase price with the debt holder;
(vi) offer the debt package to one or more third-party debt buyers;
(vii) process acceptance of the offered debt package by a third-party debt buyer;
(viii) execute a debt package purchase agreement between the debt holder and the third-party debt buyer;
(ix) execute a debt restructure agreement between the third-party buyer and the debtor; and
(x) transfer debt purchase funds from the third-party debt buyer to the debt holder; thereby completing the transfer of debt package ownership from the debt holder to the third-party debt buyer, replacing previously-existing debt owed by the debtor to the debt holder with the debt restructure agreement between the debtor and the third-party debt buyer.

8. A computer network-based system for restructuring debt, the system comprising:
(a) a means for defining a debt package to be offered for sale to one or more third-party debt buyers;
(b) a means for compiling debt characterization data for said debt package;
(c) a means for calculating a debt rating for the debt package using the compiled debt characterization data;
(d) a means for calculating the debt purchase value of the debt package using relationships that define purchase values associated with various debt ratings;
(e) a means for establishing the debt purchase price with the debt holder;
(f) a means for offering the debt package to one or more third-party debt buyers;
(g) a means for processing acceptance of the offered debt package by a third-party debt buyer;
(h) a means for executing a debt package purchase agreement between the debt holder and the third-party debt buyer;
(i) a means for executing a debt restructure agreement between the third-party buyer and the debtor; and
(j) a means for transferring debt purchase funds from the third-party debt buyer to the debt holder; thereby completing the transfer of debt package ownership from the debt holder to the third-party debt buyer, replacing previously-existing debt owed by the debtor to the debt holder with the debt restructure agreement between the debtor and the third-party debt buyer.

\* \* \* \* \*